United States Patent [19]

Zimmerman et al.

[11] 4,427,807
[45] Jan. 24, 1984

[54] GLASS REINFORCED POLY(OXYMETHYLENE) COMPOSITION HAVING IMPROVED PROPERTY RETENTION

[75] Inventors: Daniel Zimmerman, East Brunswick; Shau-Zou Lu, Whitehouse Station, both of N.J.

[73] Assignee: Celanese Corporation, New York, N.Y.

[21] Appl. No.: 436,156

[22] Filed: Oct. 22, 1982

[51] Int. Cl.³ ............................................. C08K 3/40
[52] U.S. Cl. ..................................... 523/466; 524/542
[58] Field of Search ................... 524/542; 525/398; 523/466

[56] References Cited

U.S. PATENT DOCUMENTS 3,848,021 11/1974 Sextro et al. ...................... 525/398
3,850,873 11/1974 Wrumb et al. ..................... 524/542

FOREIGN PATENT DOCUMENTS 1223522 2/1971 United Kingdom ................ 525/398

Primary Examiner—Lewis T. Jacobs
Attorney, Agent, or Firm—Maria C. H. Linn

[57] ABSTRACT

Provided is a glass reinforced molding composition which comprises a mixture of (i) a copolymer of trioxane and a cyclic ether or cyclic acetal or linear polyacetal, (ii) a terpolymer of trioxane, a cyclic ether and/or cyclic acetal and a diglycide of the formula

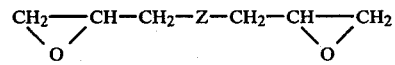

wherein Z is a carbon-to-carbon bond, an oxygen or oxyalkoxy of 1 to 8 carbon atoms or an oxy-poly(lower alkoxy), and (iii) a glass reinforcing agent. The resulting glass reinforced composition exhibits improved property retention, e.g., of properties such as tensile strength.

11 Claims, No Drawings

GLASS REINFORCED POLY(OXYMETHYLENE) COMPOSITION HAVING IMPROVED PROPERTY RETENTION

BACKGROUND OF THE INVENTION

1. Field of the Invention

The present invention relates to glass reinforced molding compositions based on oxymethylene polymers, and particularly compositions comprising a copolymer of trioxane and a cyclic ether and/or cyclic acetal. The present invention relates in particular to such glass reinforced compositions exhibiting an increased retention in properties such as tensile strength.

2. Description of the Prior Art

Oxymethylene polymers, having recurring —CH$_2$O— units, have been known for many years. They may be prepared by polymerizing a source of oxymethylene units such as anhydrous formaldehyde or trioxane, i.e., a cyclic trimer of formaldehyde.

High molecular weight solid polyoxymethylenes have been prepared by polymerizing trioxane in the presence of certain cationic catalysts, and may also be prepared in high yields and with rapid reaction rates by the use of catalysts comprising boron fluoride coordination complexes with organic compounds, as described, e.g., in U.S. Pat. No. 2,989,506 of Donald E. Hudgin and Frank M. Berardinelli. Boron fluoride gas is also a rapid and effective catalyst, as disclosed in U.S. Pat. No. 2,989,507 of Hudgin and Berardinelli. Other suitable catalysts are disclosed in the article by Kern et al in *Angewandte Chemie*, 73, (6), pages 176–186 (March 21, 1961).

The usefulness of oxymethylene copolymers in molding compositions and methods of preparing oxymethylene copolymers have also been known for years. For example, U.S. Pat. No. 3,275,604 discloses a moldable polymer comprising oxymethylene groups and oxyethylene groups, with said oxyethylene groups having a —CH$_2$OR group pendant therefrom, which may be prepared by polymerizing a source of oxymethylene units such as trioxane with a glycidyl ether.

U.S. Pat. No. 3,519,696 discloses copolymers of trioxane with cyclic ethers or cyclic acetals. The copolymers can be advantgeously prepared from mixtures of from 50 to 99.9% by weight of trioxane and from 0.1 to 50% by weight of cyclic ethers or cyclic acetals in the presence of from 0.0001 to 1.0% by weight of cation-active catalysts. The polymerization is conducted at temperatures in the range of from 62° to 115° C. in containers made from thermoplastic materials, which are crushed subsequent to the polymerization and then worked up to recover the copolymer.

U.S. Pat. No. 3,631,124 discloses a thermoplastic molding composition having improved impact strength, which compositions are obtained by mixing a polyoxymethylene such as a copolymer of formaldehyde or trioxane, with a polyether, for example, polyethylene oxide. Suitable copolymers include copolymers of trioxane with cyclic ethers, for example, ethylene oxide, or cyclic acetals, e.g., 1,3-dioxolane.

Oxymethylene terpolymers and the preparation thereof are also known to the art. For example, U.S. Pat. No. 3,385,827 discloses trioxane terpolymers obtained by copolymerizing under conditions commonly used for the production of trioxane copolymers (i) trioxane, (ii) a cyclic ether and/or cyclic formal, e.g., such as ethylene oxide, dioxalane and diethylene glycol formal, and (iii) a bifunctional diglycide such as a diglycidyl ether of ethylene glycol. In U.S. Pat. No. 3,627,850, there is also disclosed a terpolymer of 100 parts by weight of trioxane, two parts by weight of ethylene oxide and 0.1 part by weight of butanediol diglycidyl ether, the terpolymer being in mixture with a trioxane copolymer.

U.S. Pat. No. 3,848,021 discloses an oxymethylene terpolymer of trioxane, a cyclic ether or cyclic acetal and a polyether. The terpolymer is employed as a nucleating agent in a poly(oxymethylene) in order to increase the crystallization speed thereof and hence render the crystal structure of injection molded articles made therefrom more uniform. The presence of the nucleating agent further results in a decrease of the size of spherulites and thus in an improvement of the mechanical properties of shaped articles manufactured from the disclosed molding composition, which is composed of (a) from 99.9 to 80 weight percent (1) of a homopolymer of formaldehyde or trioxane, or (2) of a copolymer obtained by polymerizing a mixture of from 99.9 to 80 weight percent of trioxane and from 0.1 to 20 weight percent of a cyclic ether having from 3 to 5 ring members, or a cyclic acetal differing from trioxane having from 5 to 11 ring members, or a linear polyacetal, and (b) from 0.1 to 20 weight percent of a copolymer obtained by polymerizing a mixture of from 99.9 to 50 weight percent of trioxane and from 0 to 20 weight percent of a cyclic ether having from 3 to 5 ring members, or a cyclic acetal having from 5 to 11 ring members, or a linear polyacetal, and from 0.1 to 30 weight percent of a polyether.

Molding compositions exhibiting an increased retention of properties, such as tensile strength, and particularly molding compositions containing glass fiber reinforcement that exhibit this characteristic, are highly desirable. This is also true for molding compositions based on polyoxymethylene copolymers, wherein increased property retention can result in longer and improved performance of shaped articles made therefrom. The search for such molding compositions has been continuous, and hence, the attainment of a molding composition based on oxymethylene polymers having improved property retention could be of great benefit to the art.

Accordingly, it is an object of the present invention to provide a polyoxymethylene copolymer comprising composition which exhibits improved property retention, and in particular, improved tensile retention.

It is another object of the present invention to provide a polyoxymethylene copolymer composition having glass reinforcement which exhibits improved property retention.

It is still another object of the present invention to provide a glass reinforced molding composition based upon oxymethylene polymers which can produce shaped articles capable of improved performance, e.g., a longer useful life.

These and other objects, as well as the scope, nature and utilization of the invention, will be apparent to those skilled in the art from the following description and the appended claims.

SUMMARY OF THE INVENTION

It has now been unexpectedly discovered that a glass reinforced oxymethylene polymer composition comprising:

(i) from 50 to 95 weight percent of a copolymer of trioxane and a cyclic ether, cyclic acetal or linear polyacetal;

(ii) from 5 to 50, and more preferably from 25 to 50, weight percent of a terpolymer of trioxane, a cyclic ether and/or cyclic acetal and a diglycide of the formula

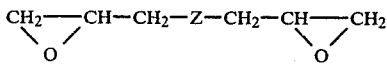

wherein Z is a carbon-to-carbon bond, an oxygen, an oxy-alkoxy of 1 to 8 carbon atoms or an oxy-poly(lower alkoxy), and (iii) a glass reinforcing agent, exhibits improved property retention upon heat aging.

It has been found that the improved property retention surprisingly is only realized upon employing the terpolymer (ii) in conjunction with the oxymethylene copolymer (i) and glass reinforcement (iii), and not when employed with the oxymethylene copolymer (i) alone. The terpolymer is preferably used in amounts of greater than 25 percent by weight of the total weight of polymer components (i) and (ii).

DETAILED DESCRIPTION OF THE PREFERRED EMBODIMENTS

The copolymer of the molding composition of the present invention is a copolymer of trioxane and a cyclic ether or cyclic acetal or linear polyacetal. Particularly suitable comonomers for trioxane in the preparation of the copolymer are cyclic ethers having from 3 to 5 ring members, preferably epoxides, and cyclic acetals differing from trioxane having from 5 to 11, and preferably from 5 to 8, ring members, especially cyclic formals of $\alpha,\omega$-diols having from 2 to 8, and preferably from 2 to 4, carbon atoms, the carbon chain of which may be interrupted by an oxygen atom at intervals of 2 carbon atoms, each in an amount of from 0.1 to 20, and preferably from 0.5 to 10 weight percent. Most advantageous are copolymers containing from 99 to 95 weight percent trioxane and from 1 to 5 weight percent of at least one of the abovementioned comonomeric components.

Examples of suitable cyclic ethers are, for example, ethylene oxide, styrene oxide, propylene oxide, dioxolane, diethylene glycol formal, dioxane, trimethylene oxide, tetramethylene oxide, pentamethylene oxide, butylene oxide, 2,2-di(chloromethyl)-1,3-propylene oxide, or epichlorhydrin or phenylglycidyl ether, with ethylene oxide being preferred.

Examples of suitable cyclic acetals are, for example, glycol formal (1,3, dioxolane), butadiene formal (1,3-dioxepane), diglycol formal (1,3,6-trioxocane), furthermore 4-chloromethyl-1,3-dioxolane or hexanediol formal (1,3-dioxoanane).

As linears polyacetals there may be used homopolymers or copolymers of the cyclic acetals described above, as well as linear condensates of aliphatic or cyclo-aliphatic $\alpha,\omega$-diols with aliphatic aldehydes or thioaldehydes, preferably formaldehyde. Particularly suitable are homopolymers of linear formals of aliphatic $\alpha,\omega$-diols having from 2 to 8, and most preferably from 2 to 4 carbon atoms.

The copolymer can be prepared in known manners by polymerization of the monomers in the presence of a cationic active catalyst at a temperature of from 0° to 100° C., and preferably from 50° to 90° C. As catalysts, there may be used protonic acids, for example perchloric acid, or Lewis acids, for example tin tetrachloride, arsenic pentafluoride, phosphorus pentafluoride or boron trifluoride, or complex or salt-like compounds, for example boron trifluoride etherates, triethyloxonium tetrafluoro-borate, triphenylmethyl-hexafluorophosphate or acetyl perchlorate, with a boron trifluoride catalyst being most preferred. The polymerization may be carried out in bulk, in suspension or in solution. In order to remove unstable portions, the copolymers can be advantageously subjected to a controlled thermal or hydrolytic degradation to primary terminal alcohol groups. Further detail with regard to various preparations of the copolymer can be gained from U.S. Pat. Nos. 3,848,021 and 3,519,696, which are hereby expressly incorporated by reference.

The other polymer component (ii) of the molding composition of the present invention is a terpolymer, the inclusion of which into the glass reinforced composition results in the increased property retention, i.e., tensile retention. The terpolymer of the present invention is prepared by reacting trioxane and a cyclic ether and/or cyclic acetal such as in the preparation of the oxymethylene copolymer, with a third monomer which is a bifunctional compound such as a diglycide of the formula

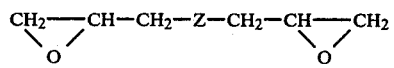

wherein Z represents a carbon-to-carbon bond, an oxygen atom, an oxy-alkoxy of up to 8 carbon atoms, preferably 2 to 4 carbon atoms, and which may be an oxycycloalkoxy of 4 to 8 carbon atoms, or an oxy-poly(lower alkoxy), preferably of 2 to 4 recurring groups each with 1 to 2 carbon atoms, for example, ethylene diglycide, diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, advantageously of 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,2 propane-diol, cyclohexane-1, 4-diol and 2-dimethyl-4-dimethylcyclobutane-1,3-diol, with butanediol diglycidyl ethers being most preferred.

Generally, in preparing the terpolymer of a trioxane, cyclic ether and/or cyclic acetal and at least one bifunctional diglycide compound, a ratio of from 99.89 to 89.0 weight percent trioxane 0.1 to 10 percent by weight of the cyclic ether and/or cyclic acetal, and 0.01 to 1 weight percent of the bifunctional compound is preferred, with the percentage figures being based on the total weight of monomers used in forming the terpolymer. The terpolymers thus obtained are characterized as being essentially colorless and having a particularly good extrudability.

The polymerization of the terpolymer may be carried out according to known methods, that is in substance, solution or suspension, while using the above-mentioned quantitative proportions of the termonomers. As solvents, there may advantageously be used inert aliphatic or aromatic hydrocarbons, halogenated hydrocarbons or ethers. The polymerization in substance takes a particularly smooth course.

In some cases it may be advantageous to use the following quantitative proportions: 99.85 to 80.5 percent by weight of trioxane, 0.1 to 10 percent by weight of cyclic ether or cyclic acetal, and 0.05 to 0.5 percent by weight of diglycidyl ether, the percentage figures being calculated on the total weight of the monomer mixture used for preparing the terpolymer.

The polymerization is advantageously carried out at temperatures at which trioxane does not crystallize out, that is, at a temperature within the range of $-50°$ to $+100°$ C., depending on the solvent used, and in the absence of a solvent at a temperature within the range of $+20°$ to $+100°$ C.

As catalysts, all substances may be used which are capable of initiating a cationic polymerization, for example, organic or inorganic acids, acid halides and advantageously Lewis acids. Of the latter, boron fluoride and its complex compounds, for example, etherates of boron fluoride, are advantageously used. Diazonium fluoroborates are particularly advantageous.

The concentration of the catalyst may vary within wide limits depending on the nature of the catalyst and on the intended molecular weight of the terpolymer. The concentration of the catalyst may be within the range of 0.0001 to 1% by weight, calculated on the total monomer mixture, and is advantageously within the range of 0.001 to 0.1% by weight.

Since the catalysts to be used in the process of the invention tend to decompose the polymer, the catalyst is advantageously neutralized immediately after the polymerization, for example, with ammonia or methanolic or acetonic amine solutions.

The unstable terminal hemiacetal groups may be removed in the same manner as known for other polymers. Advantageously, the polymer is suspended in aqueous ammonia at temperatures within the range of 100° to 200° C., and if desired, in the presence of a swelling agent such as methanol or n-propanol. Alternatively, the polymer is dissolved in an alkaline medium at temperatures above 100° C. and subsequently reprecipitated. Examples of suitable solvents are benzyl alcohol, ethylene glycol monoethyl ether or a mixture of 60% methanol and 40% water. Examples of suitable compounds having an alkaline reaction are ammonia and aliphatic amines.

It is also possible to thermally stabilize the terminal groups in the absence of a solvent in the melt in the presence of a stabilizer.

Alternatively, the polymer can be subjected to heterogeneous hydrolysis wherein water, with or without a catalyst, e.g., an aliphatic or aromatic amine, is added to a melt of the polymer in an amount ranging from about 1 to about 50 percent based on the weight of the polymer. The polymer mixture is maintained at a temperature in the range of from about 170° to 250° C. for a specified period of time, and then washed with water and dried or centrifuged.

The third component of the molding composition of the present invention is the glass reinforcement. Any conventional glass reinforcement may be employed, with glass fibers being the most widely used and most preferred. The glass reinforcement can also be chemically treated with conventional agents such as epoxides, isocyanates, methylol melamines, methylol ureas, silanes, siloxanes or any other agent reactive with glass. Such agents can be used to improve properties or the compatability of the glass with the base polymer.

The amount of poly(oxymethylene) copolymer derived from trioxane and a cyclic ether and/or acetal employed in the molding composition of the present invention is advantageously from 50 to about 95 percent by weight of the total weight of polymer in the composition, but is more preferably in the range of from about 50 to about 75 weight percent. The amount of poly(oxymethylene) terpolymer employed in accordance with the present invention can range from about 5 to about 50 weight percent of the total amount of polymer in the composition, but is more preferably in the range of from about 25 to about 50 weight percent, and most preferably in the range of from about 30 to 40 weight percent, for in the latter preferred ranges the property retention exhibited by the overall molding composition has been observed to be most superior. The amount of glass reinforcement employed in the molding composition of the present invention can range generally from 0.1 to about 50 weight percent, and is more preferably in the range of from about 10 to about 30 weight percent based upon the total weight of the polymer content in the molding composition.

Particularly good retention of properties over time is exhibited in a molding composition containing from about 60 to 70 percent by weight copolymer, about 30 to 40 weight percent of terpolymer, and about 25 percent by weight of the glass fiber reinforcement.

Both the copolymer and terpolymer components of the molding composition may be mixed with conventional stabilizers against the action of heat, oxygen and light, and subsequently homogenized in the melt. Suitable heat stabilizers are, for example, polyamides, amides of polybasic carboxylic acids, cyanoguanidine, hydrazines, ureas and poly(N-vinyl-lactams). As oxidation stabilizers, phenol, especially bisphenols, and aromatic amines are used and suitable stabilizers against the action of light are derivatives of α-hydroxy-benzophenone and of benzotriazole, the stabilizers being used in an amount of from 0.1 to 10 weight percent, and more preferably from 0.5 to 5 weight percent, calculated on the mixture of polymers.

The molding composition of the present invention can be prepared by simply mixing the various components in their desired amounts using conventional means. For example, mixing can be accomplished with conventional extrusion equipment, same being heated to a temperature of from 180°–220° C. The components can be rear or side fed, with the screw design, etc. being optimized to provide uniform and effective mixing of the components.

Typically, for example, if a stabilizer is used, e.g., comprising 2,2′methylene bis(4-methyl-6-tert-butyl phenol) and cyanoguanidine, it can be added to the glass, the polyoxymethylene copolymer and terpolymer and mixed at about 190° C. in a 2½ inch compounding extruder. Strands obtained from the extruder can then be quenched in water.

The molding composition of the invention can then be comminuted mechanically, for example by chopping or grinding, into granules, chips, flakes or powders, and processed in the thermoplastic state, for example by injection molding or extrusion, into shaped articles, for example bars, rods, plates, sheets, films, ribbons and tubes.

The following examples are given as specific illustrations of the claimed invention. It should be understood, however, that the specific details set forth in the examples are merely illustrative and in nowise limitative. All parts and percentages in the examples and the remainder of the specification are by weight unless otherwise specified.

EXAMPLE

Five different glass fiber reinforced poly(oxymethylene) compositions were prepared having varying amounts of a commercially available terpolymer therein. The commercially available terpolymer is available under the designation U10-11 from the Celanese Corporation and is a butanediol diglycidyl ether, ethylene oxide, oxymethylene terpolymer containing about 0.5 weight percent, 2.0 weight percent and 97.95 weight percent of each component respectively. The copolymer employed in the compositions comprised 98 percent by weight poly(oxymethylene) and 2 percent by weight ethylene oxide. The compositions were tested for their retentiveness of properties over time.

The five compositions contained about 0, 10, 20, 35 and 100 percent by weight terpolymer respectively, with the weight percent being based upon the total amount of polymers in the composition. Each compositional blend also contained about 25 percent by weight (based on the total polymer weight) of glass fiber and about 0.6 percent by weight of a stabilizer system containing 2,2'-methylene bis(4-methyl-6-tert-butyl phenol) and cyanoguandine.

The testing for retention of properties over time comprised molding the compositional blends into test specimen bars and oven aging the test specimens at 130° C., 140° C. and 150° C. for a period of time up to 100 days while periodically pulling and testing the specimens for tensile strength in psi in accordance with the standard ASTM procedure on an Instrom Tensile Tester at a 0.2 inch/minute strain rate. The results of the runs are tabulated in Tables 1-3 below.

TABLE I

150° C. OVEN AGING

| % Copolymer | % Terpolymer | TIME (DAYS) | TENSILE STRENGTH (psi) |
|---|---|---|---|
| 100 | 0 | 0 | 13,000 |
| | | 3 | 12,200 |
| | | 7 | 12,350 |
| | | 11 | 12,670 |
| | | 14 | 13,000 |
| | | 17 | 13,400 |
| | | 24 | 13,600 |
| | | 31 | 10,100 |
| | | 40 | 8,800 |
| | | 75 | 6,300 |
| | | 90 | 4,100 |
| 90 | 10 | 0 | 12,700 |
| | | 3 | 12,800 |
| | | 7 | 13,420 |
| | | 11 | 13,440 |
| | | 14 | 14,000 |
| | | 17 | 14,100 |
| | | 24 | 15,300 |
| | | 31 | 11,600 |
| | | 40 | 10,500 |
| | | 75 | 8,040 |
| | | 90 | 6,600 |
| 80 | 20 | 0 | 12,900 |
| | | 3 | 12,800 |
| | | 7 | 13,460 |
| | | 11 | 13,780 |
| | | 14 | 14,300 |
| | | 17 | 13,800 |
| | | 24 | 14,600 |
| | | 31 | 10,700 |
| | | 40 | 10,800 |
| | | 75 | 7,500 |
| | | 90 | 6,200 |
| 65 | 35 | 0 | 13,500 |
| | | 3 | 13,000 |
| | | 7 | 13,140 |
| | | 11 | 13,370 |
| | | 14 | 13,900 |
| | | 17 | 14,000 |
| | | 24 | 14,600 |
| | | 31 | 13,800 |
| | | 40 | 12,400 |
| | | 75 | 10,100 |
| | | 90 | 6,600 |
| 0 | 100 | 0 | 12,900 |
| | | 3 | 12,700 |
| | | 7 | 13,310 |
| | | 11 | 13,130 |
| | | 14 | 13,200 |
| | | 17 | 13,800 |
| | | 24 | 13,200 |
| | | 31 | 11,200 |
| | | 40 | 9,800 |
| | | 75 | 5,900 |
| | | 90 | 4,500 |

TABLE II

140° C. OVEN AGING

| % Copolymer | % Terpolymer | TIME (DAYS) | TENSILE STRENGTH (psi) |
|---|---|---|---|
| 100 | 0 | 0 | 13,000 |
| | | 7 | 12,270 |
| | | 14 | 12,800 |
| | | 28 | 11,900 |
| | | 35 | 14,000 |
| | | 42 | 13,700 |
| | | 75 | 12,200 |
| | | 90 | 10,600 |
| 90 | 10 | 0 | 12,700 |
| | | 7 | 12,700 |
| | | 14 | 13,500 |
| | | 28 | 12,700 |
| | | 35 | 15,000 |
| | | 42 | 14,900 |
| | | 75 | 13,500 |
| | | 90 | 12,000 |
| 80 | 20 | 0 | 12,900 |
| | | 7 | 12,420 |
| | | 14 | 13,600 |
| | | 28 | 12,900 |
| | | 35 | 14,800 |
| | | 42 | 14,900 |
| | | 75 | 15,100 |
| | | 90 | 13,600 |
| 65 | 35 | 0 | 13,500 |
| | | 7 | 13,150 |
| | | 14 | 14,100 |
| | | 28 | 14,600 |
| | | 35 | 14,600 |
| | | 42 | 14,900 |
| | | 75 | 12,300 |
| | | 90 | 11,600 |
| 0 | 100 | 0 | 12,900 |
| | | 7 | 12,280 |
| | | 14 | 13,400 |
| | | 28 | 11,800 |
| | | 35 | 13,700 |
| | | 42 | 13,200 |
| | | 75 | 11,700 |
| | | 90 | 11,100 |

TABLE III

130° C. OVEN AGING

| % Copolymer | % Terpolymer | TIME (DAYS) | TENSILE STRENGTH (psi) |
|---|---|---|---|
| 100 | 0 | 0 | 13,000 |
|  |  | 7 | 12,300 |
|  |  | 14 | 12,210 |
|  |  | 21 | 12,200 |
|  |  | 35 | 12,400 |
|  |  | 42 | 12,200 |
|  |  | 80 | 13,400 |
|  |  | 100 | 13,100 |
| 90 | 10 | 0 | 12,700 |
|  |  | 7 | 12,600 |
|  |  | 14 | 12,720 |
|  |  | 21 | 13,000 |
|  |  | 35 | 13,400 |
|  |  | 42 | 15,300 |
|  |  | 80 | — |
|  |  | 100 | 14,900 |
| 80 | 20 | 0 | 12,900 |
|  |  | 7 | 12,700 |
|  |  | 14 | 12,800 |
|  |  | 21 | 13,500 |
|  |  | 35 | 13,200 |
|  |  | 42 | 13,400 |
|  |  | 80 | 13,800 |
|  |  | 100 | 14,700 |
| 65 | 35 | 0 | 13,500 |
|  |  | 7 | — |
|  |  | 14 | 13,000 |
|  |  | 21 | 12,900 |
|  |  | 35 | 13,300 |
|  |  | 42 | 13,400 |
|  |  | 80 | 14,300 |
|  |  | 100 | 14,800 |
| 0 | 100 | 0 | 12,900 |
|  |  | 7 | — |
|  |  | 14 | — |
|  |  | 21 | 12,000 |
|  |  | 35 | 12,600 |
|  |  | 42 | 12,500 |
|  |  | 80 | 13,800 |
|  |  | 100 | 13,600 |

As can be seen from the foregoing examples, a glass reinforced molding composition comprising a poly(oxymethylene) copolymer in accordance with the present invention and a poly(oxymethylene) terpolymer in accordance with the present invention retains its properties, as indicated by a retention of its tensile strength, over time better than a glass fiber reinforced composition comprised of the poly(oxymethylene) copolymer alone or a glass fiber reinforced composition comprised of the poly(oxymethylene) terpolymer alone. This is particularly evident from noting the measurements of tensile strength over time in a 150° C. oven, which heat aging simulates longer time exposure at reduced temperatures. The higher temperature acts as an accelerator of the aging process so that the 150° C. test in essence provides a more accurate account of property retention over long periods of time. In the 150° C. run, the 65 percent copolymer and 35 percent terpolymer specimen was far superior in retaining its tensile strength in the period of from 35-75 days.

Due to the increase in tensile property retention exhibited by the molding composition of the present invention, the composition finds particular applicability for appliance, industrial and automotive purposes where high tensile retention is a desired property, e.g., in gears and windshield wipers. The improved ability of the molded articles made from the molding composition of the present invention to maintain its tensile properties over time allows for longer, and hence, improved performance.

The improvement in property retention is also uniquely attributable to glass reinforced poly(oxymethylene) compositions. For, when the poly(oxymethylene) terpolymer in accordance with the present invention is added solely to the copolymer without any glass reinforcement, little if any improvement in property retention is observed over the copolymer and terpolymer per se. This is demonstrated by the following Comparative Example.

COMPARATIVE EXAMPLE

Five different poly(oxymethylene) copolymer compositions were again prepared having varying amounts of terpolymer therein in accordance with the foregoing Example. The compositions were tested for their retention of properties over time via heat aging test specimens made therefrom at 130° C., 140° C. and 150° C. for a period of time up to about 100 days. The five compositions contained about 0, 10, 20, 35 and 100 percent by weight of the terpolymer respectively, with the weight percent being based upon the total amount of polymers in the compositions. Each compositional blend also contained the 0.6 percent by weight of stabilizer system as in the previous Example, but contained no glass reinforcing agent. Thus, the only difference in the compositions of the present comparative Example vis-a-vis the compositions of the foregoing Example is the absence of the glass reinforcing agent. The results of the runs are tabulated in Tables IV to VI below.

TABLE IV

150° C. OVEN AGING

| % Copolymer | % Terpolymer | TIME (DAYS) | TENSILE STRENGTH (psi) |
|---|---|---|---|
| 100 | 0 | 0 | 7500 |
|  |  | 4 | — |
|  |  | 7 | 8580 |
|  |  | 11 | 8730 |
|  |  | 14 | 8770 |
|  |  | 17 | 8215 |
|  |  | 28 | 3200 |
|  |  | 35 | 2900 |
|  |  | 42 | 1400 |
| 90 | 10 | 0 | 7500 |
|  |  | 4 | 9300 |
|  |  | 7 | 8690 |
|  |  | 11 | 8950 |
|  |  | 14 | 9000 |
|  |  | 17 | 9100 |
|  |  | 28 | 3550 |
|  |  | 35 | 1700 |
|  |  | 42 | 1500 |
| 80 | 20 | 0 | 7700 |
|  |  | 4 | 9400 |
|  |  | 7 | 8910 |
|  |  | 11 | 8900 |
|  |  | 14 | 9100 |
|  |  | 17 | 9200 |
|  |  | 28 | 2800 |
|  |  | 35 | 740 |
|  |  | 42 | 810 |
| 65 | 35 | 0 | 8100 |
|  |  | 4 | 9500 |
|  |  | 7 | 8940 |
|  |  | 11 | 8910 |
|  |  | 14 | 9100 |
|  |  | 17 | 7200 |
|  |  | 28 | 2400 |
|  |  | 35 | 1820 |
|  |  | 42 | 1200 |
| 0 | 100 | 0 | 7300 |
|  |  | 4 | 9100 |
|  |  | 7 | 9360 |

TABLE IV-continued

150° C. OVEN AGING

| % Copolymer | % Terpolymer | TIME (DAYS) | TENSILE STRENGTH (psi) |
|---|---|---|---|
| | | 11 | 8920 |
| | | 14 | 9000 |
| | | 17 | 8300 |
| | | 28 | 2700 |
| | | 35 | 1100 |
| | | 42 | 1200 |

TABLE V

140° C. OVEN AGING

| % Copolymer | % Terpolymer | TIME (DAYS) | TENSILE STRENGTH (psi) |
|---|---|---|---|
| 100 | 0 | 0 | 7500 |
| | | 7 | 8630 |
| | | 14 | 9090 |
| | | 28 | 9300 |
| | | 32 | 8600 |
| | | 42 | 7200 |
| | | 75 | 3700 |
| | | 90 | 2500 |
| 90 | 10 | 0 | 7500 |
| | | 7 | 8960 |
| | | 14 | 9110 |
| | | 28 | 9500 |
| | | 32 | 7600 |
| | | 42 | 6000 |
| | | 75 | 2800 |
| | | 90 | 1500 |
| 80 | 20 | 0 | 7700 |
| | | 7 | 9105 |
| | | 14 | 8840 |
| | | 28 | 9300 |
| | | 32 | 6600 |
| | | 42 | 3900 |
| | | 75 | 2600 |
| | | 90 | 1400 |
| 65 | 35 | 0 | 8100 |
| | | 7 | 9180 |
| | | 14 | 9250 |
| | | 28 | 9500 |
| | | 32 | 8400 |
| | | 42 | 4400 |
| | | 75 | 3100 |
| | | 90 | 900 |
| 0 | 100 | 0 | 7300 |
| | | 7 | 9010 |
| | | 14 | 8910 |
| | | 28 | — |
| | | 32 | 6400 |
| | | 42 | 4500 |
| | | 75 | 3300 |
| | | 90 | 1100 |

TABLE VI

130° C. OVEN AGING

| % Copolymer | % Terpolymer | TIME (DAYS) | TENSILE STRENGTH (psi) |
|---|---|---|---|
| 100 | 0 | 0 | 7500 |
| | | 7 | 8820 |
| | | 14 | 9690 |
| | | 21 | 9000 |
| | | 35 | 8970 |
| | | 42 | 9300 |
| | | 80 | 9600 |
| | | 95 | 9300 |
| 90 | 10 | 0 | 7500 |
| | | 7 | 8470 |
| | | 14 | 8750 |
| | | 21 | 9200 |
| | | 35 | 9600 |
| | | 42 | 9600 |
| | | 80 | 6600 |
| | | 95 | 5700 |
| 80 | 20 | 0 | 7700 |
| | | 7 | 9390 |
| | | 14 | 8790 |
| | | 21 | 9300 |
| | | 35 | 9400 |
| | | 42 | 9900 |
| | | 80 | 9100 |
| | | 95 | 5700 |
| 65 | 35 | 0 | 8100 |
| | | 7 | 9550 |
| | | 14 | 9500 |
| | | 21 | 9300 |
| | | 35 | 9600 |
| | | 42 | 9700 |
| | | 80 | — |
| | | 95 | 6400 |
| 0 | 100 | 0 | 7300 |
| | | 7 | 9270 |
| | | 14 | 8870 |
| | | 21 | 8600 |
| | | 35 | 9200 |
| | | 42 | 9200 |
| | | 80 | 9200 |
| | | 95 | 6300 |

As can be seen from the foregoing Tables, little if any improvement in property retention is observed over the copolymer and terpolymer per se when the terpolymer and copolymer are mixed without any glass reinforcement.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A glass reinforced molding composition comprising
   (i) from about 50 to 95 weight percent of a copolymer of trioxane and a cyclic ether, cyclic acetal or linear polyacetal;
   (ii) from about 5 to about 50 weight percent of a terpolymer of trioxane, a cyclic ether and/or cyclic acetal and a diglycide of the formula

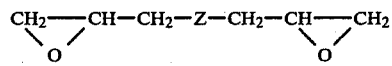

wherein Z is a carbon-to-carbon bond, an oxygen, an oxy-alkoxy of 1 to 8 carbon atoms or an oxy-poly(lower alkoxy), and
   (iii) a glass reinforcing agent in an amount ranging from about 0.1 to 50 weight percent based upon the total weight of components (i) and (ii).

2. The composition of claim 1 wherein the glass reinforcing agent comprises glass fibers.

3. The composition of claim 1 wherein the copolymer (i) is derived from ethylene oxide as the cyclic ether.

4. The composition of claim 1 or 3 wherein the terpolymer (ii) is derived from butanediol diglycidyl ethers as the diglycide.

5. The composition of claim 4 wherein the terpolymer (ii) is derived from ethylene oxide as the cyclic ether.

6. The composition of claim 1 wherein the amount of copolymer (i) ranges from about 50 to 75 weight percent and the amount of terpolymer (ii) ranges from about 25 to 50 weight percent.

7. The composition of claim 6 wherein the copolymer (i) is derived from trioxane and ethylene oxide and the terpolymer (ii) is derived from trioxane, ethylene oxide and a butanediol glycidyl ether.

8. A glass reinforced molding composition comprising
(i) from about 60 to 70 weight percent of a copolymer of trioxane and a cyclic ether, cyclic acetal or linear polyacetal;
(ii) from about 30 to 40 weight percent of a terpolymer of trioxane, a cyclic ether and/or cyclic acetal and a diglycide of the formula

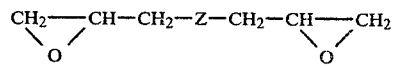

wherein Z is a carbon-to-carbon bond, an oxygen, an oxy-alkoxy of 1 to 8 carbon atoms or an oxy-poly(lower alkoxy), and
(iii) from about 0.1 to 50 weight percent of glass fibers, with the percentages by weight being based upon the total weight of components (i) and (ii).

9. The composition of claim 8 wherein the amount of glass fibers is about 25 percent by weight.

10. The composition of claim 8 or 9 wherein the copolymer (i) is derived from trioxane and ethylene oxide and the terpolymer (ii) is derived from trioxane, ethylene oxide and butanediol glycidyl ether.

11. A shaped or molded article comprising the composition of claim 1 or 8.

* * * * *